ity# United St

[11] 3,622,796

| [72] | Inventor | Clyde W. Harris<br>Santa Barbara, Calif. |
|---|---|---|
| [21] | Appl. No. | 876,297 |
| [22] | Filed | Nov. 13, 1969 |
| [45] | Patented | Nov. 23, 1971 |
| [73] | Assignee | The Te Company<br>Santa Barbara, Calif. |

[54] SELECTIVE COLLECTOR FOR THE WIDE-ANGLE PORTION OF A RADIATION BEAM
8 Claims, 3 Drawing Figs.

[52] U.S. Cl. ................................................. 250/227,
250/71 R, 250/218, 350/96 R, 356/103
[51] Int. Cl. .............................................................. G01n 21/22
[50] Field of Search ............................................. 250/71,
227, 218; 356/103 R; 350/96 R

[56] References Cited
UNITED STATES PATENTS
3,190,172  6/1965  Langberg ..................... 250/86 X
3,506,359  4/1970  Burke, Jr. et al. .............. 250/218

*Primary Examiner*—James W. Lawrence
*Assistant Examiner*—Morton J. Frome
*Attorney*—Charlton M. Lewis ABSTRACT: Radiation-translating devices such as resonance backscatter cells and other fluorescent bodies receive incident radiation in a concentrated beam and emit processed radiation in diffuse form. The present system separates such processed radiation from any unprocessed incident radiation specularly reflected from the cell window by receiving both in an optical light pipe coaxial with the unwanted radiation. The light pipe is laterally immersed in an optical medium of such index that the unwanted radiation is retained by total reflection in the pipe and a major portion of the initially diffuse processed radiation is transmitted through the sidewalls to form an annular beam of moderate solid angle suitable for further processing by conventional optics. The same light pipe may also supply the beam of incident radiation to the translating device.

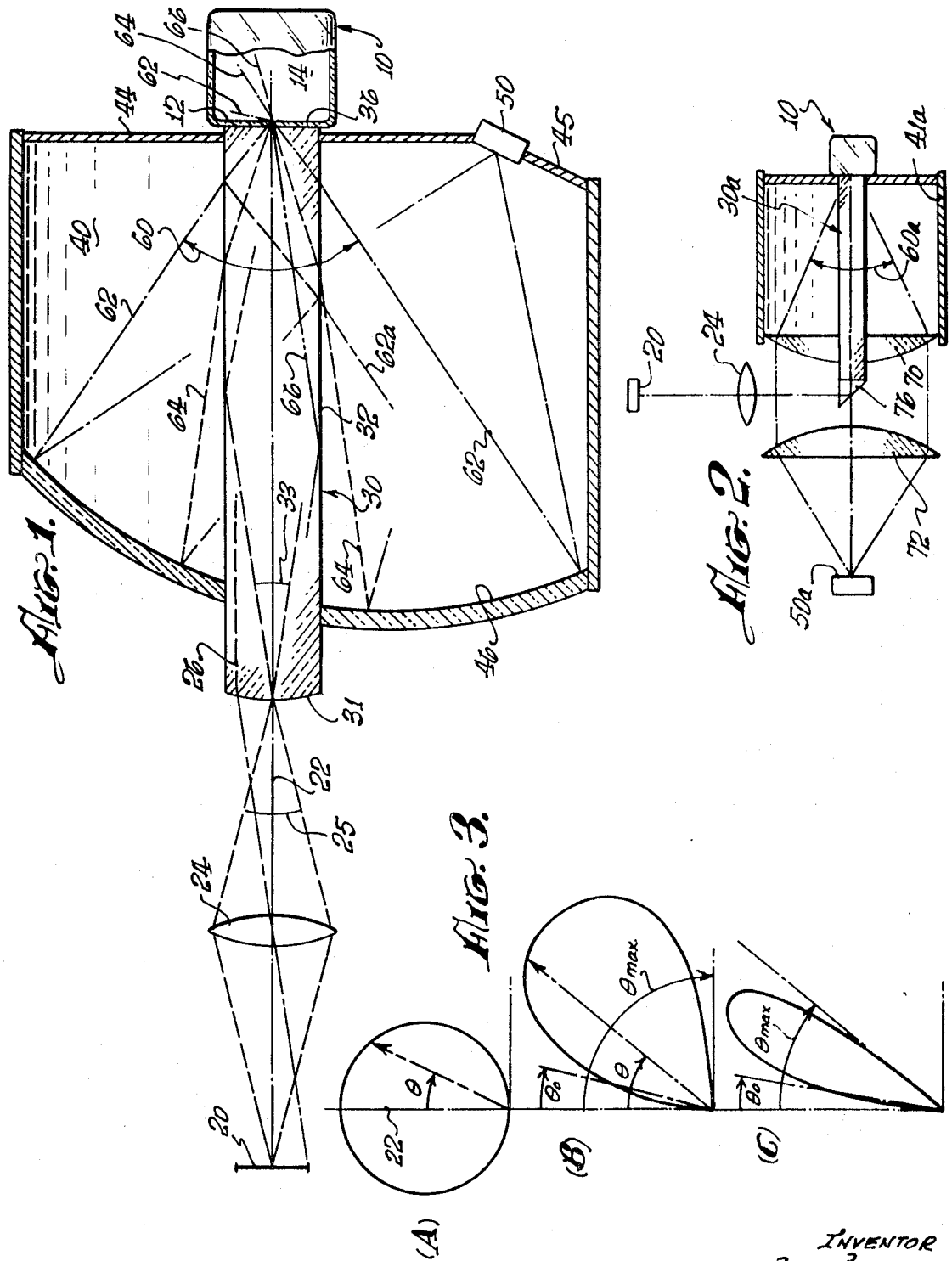

SELECTIVE COLLECTOR FOR THE WIDE-ANGLE PORTION OF A RADIATION BEAM

This invention has to do generally with apparatus which receives electromagnetic radiation of optical wavelength as a relatively concentrated beam, modifies some characteristic of the radiation, and delivers the translated or processed radiation in a relatively diffuse form. Effective utilization of such radiation-translating apparatus often depends upon collecting the diffuse processed radiation with maximum efficiency and with minimum contamination by incident radiation that has not been processed.

The present invention is concerned especially with improved optical means for supplying radiation to such translating apparatus, and for receiving the translated or processed radiation with minimum loss and with minimum contamination by unprocessed incident radiation.

In accordance with one aspect of the invention, the diffuse processed radiation is received from the exit aperture of the processing apparatus by a light pipe of optical material. The sidewalls of the light pipe are immersed in an optical medium having a selected index of refraction slightly less than that of the pipe. All processed radiation entering the light pipe and forming an angle with the pipe axis greater than a critical value then escapes from the sidewalls of the pipe into the surrounding medium as a beam of annular form typically surrounding the light pipe and coaxial with it. The half-angle of that beam is small enough that the beam can be manipulated conveniently by ordinary optical means, as to focus it upon a radiation detector or other utilization device. Yet the beam typically includes radiation delivered by the apparatus at angles with the axis from a definite minimum threshold value up to essentially 90°.

In accordance with a further aspect of the invention if the light-translating apparatus is of a type that receives incident radiation and delivers processed radiation in opposite directions through the same aperture, the incident radiation is supplied to the apparatus through the same light pipe that receives the processed radiation. The difference between the indices of refraction of the light pipe and of the medium periphery immersing it is made just sufficient to insure total reflection at the pipe sidewalls of the entire incident beam and preferably also of any incident radiation that is specularly reflected back into the light pipe without being processed, as by reflection at the entrance window of the translating apparatus. Such incident radiation is then retained by total reflection within the light pipe and does not contaminate the processed radiation transmitted through the sidewalls of the pipe.

If the translating apparatus has separate entrance and exit apertures, the incident radiation may be supplied to the entrance aperture by conventional optical means, but in such a way that any incident radiation transmitted unprocessed through the exit aperture is directed along the axis of the described light pipe. With suitable selection of materials, such unprocessed radiation is retained within the light pipe by total reflection in the manner already described.

The invention is useful in connection with many different types of light-translating apparatus, including apparatus for producing molecular scattering, flourescence and the like. For the sake of definiteness the invention will be described primarily with relation to apparatus utilizing a form of fluorescence which will be referred to as resonance backscatter. A related form of resonance scattering has been described, for example, in U.S. Pat. No. 3,190,172, issued June 22, 1965 to Edwin Langberg.

Many gases or vapors, of which sodium and mercury are illustrative, are capable of strongly absorbing radiation of one or more sharply defined wavelengths, with excitation of the gas atoms or molecules to a higher energy state. In some instances such excited atoms or molecules return to their initial energy state with emission of radiation of essentially the same wavelength that was absorbed. In other cases the light emission involves a different energy transition, and the wavelength of the emitted light is quite different from that absorbed. Resonance backscatter of either type produces radiation of sharply defined wavelength from an initial source which may include many other wavelengths, thus acting essentially as a filter with extremely sharp cutoff characteristics.

Whereas the incident radiation typically comprises a rather narrowly limited beam, the reemitted radiation is randomly distributed. Assuming illumination of a body of gas through a plane window, for example, the radiation reemitted back through the window is distributed throughout $2\pi$ steradians, the intensity in any direction being essentially proportional to the cosine of the angle from the normal to the window. The usefulness of resonance backscatter cells for sharply filtering radiation has been severely limited by the difficulty experienced in collecting the diffusely reemitted radiation.

By solving that problem of effectively collecting diffusely scattered radiation, and particularly by helping to eliminate from the collected radiation any unprocessed incident radiation that has been specularly reflected by cell windows and the like, the present invention greatly extends the practical utility of resonance backscatter and of many other processes of the general type described above.

A full understanding of the invention, and of its further objects and advantages, will be had from the following description of certain illustrative manners of carrying it out. The particulars of that description, and of the accompanying drawings which form a part of it, are intended only as illustration and not as a limitation upon the scope of the invention, which is defined in the appended claims.

In the drawings:

FIG. 1 is a schematic axial section representing an illustrative system embodying the invention;

FIG. 2 is a section representing a modification; and

FIG. 3 is a graph of radiation flux distribution.

In FIG. 1 a resonance backscatter cell is indicated generally at 10. Incident radiation is received through the window 12 and backscatter radiation is diffusely reemitted outward through the same window. Cell 10 comprises a chamber 14 containing a vapor of a material such as sodium or mercury, for example, which is capable of strongly absorbing at least one discrete wavelength of the incident radiation and of reemitting that same wavelength with random distribution. In practice, chamber 14 is ordinarily maintained at elevated temperature by conventional means not explicitly shown, in order to provide a sufficient concentration of vapor.

Radiation for energizing cell 10 may be derived from a source of any desired type, shown illustratively as the radiation-emitting surface 20, centered on the optical axis 22. Radiation from source 20 is typically concentrated by the lens 24 upon the entrance end 32 of the coaxial light pipe 30. The other end 36 of light pipe 30 directly faces cell window 12, and may optically contact that window, as by insertion between them of a suitable liquid. Alternatively, the light pipe may project into cell 10, so that its end 36 forms the cell window. A field lens is preferably provided at the entrance end of the light pipe, with sufficient power to make all the principal rays from source 20 parallel to axis 22 within light pipe 30, as represented typically at 26. Such a lens may comprise suitable convex curvature of end face 31. The incident radiation beam within the light pipe is then generally parallel to axis 22, and the greatest deviation from the axis corresponds to the light cone 25 defined by the effective aperture of lens 24. For purposes of illustration, the numerical aperture of that lens is represented as $f/2$. Refraction at entrance surface 31 reduces the initial conical angle at 25 to a smaller angle within pipe 30, as indicated at 33.

A major portion of the length of light pipe 30 is optically immersed in an optical medium 40, having an index of refraction typically only slightly less than the index of refraction of light pipe 30. Medium 40 is typically a transparent liquid filling the chamber 41. That chamber is formed by the cylindrical coaxial sleeve 42, the end plate 44, which closes the end of sleeve 42 adjacent cell 10, and the optical concave mirror 46, which closes the other end of the sleeve adjacent source 20. End plate 44 and mirror 46 are provided with apertures through which the respective ends of light pipe 30 project, and which are sealed in any suitable manner to retain the liquid in the chamber. A light-receiving device 50 is mounted on an oblique portion 45 of end plate 44, typically comprising a radiation detector of conventional type.

The material of light pipe 30 and of its immersing liquid 40 are selected to have suitable indices of refraction. The ratio of those indices of refraction defines a threshold angle such that all rays incident upon sidewall 32 at less than that angle are totally reflected back into the light pipe, while radiation incident at greater angles is partially transmitted through the sidewall into the immersing medium 40. The indices are so selected that the threshold angle just described is larger than the angle between axis 22 and the most divergent rays of the incident light beam within light pipe 30. The entire incident beam is then transmitted the full length of the light pipe and delivered through edn face 36 directly into cell 10.

Radiation diffusely reemitted from cell 10 through window 12 and end face 36 into light pipe 30 comprises two primary components. One component comprising rays such as 66 which form with axis 22 angles smaller than the above defined threshold angle, is totally reflected at sidewalls 32 and remains in the light pipe. Any unprocessed incident light specularly reflected at end wall 36 or window 12 is similarly retained by total reflection within the light pipe. The second component, comprising rays such as 62 and 64 forming with axis 22 angles larger than the threshold angle, is largely transmitted through sidewalls 32 into medium 40, forming the radiation beam indicated at 60. Since the change of index at the sidewall is small, typically less than 0.05, only a small fraction of radiation of the second component is reflected back into the light pipe. That reflected radiation in general again strikes the sidewall at an angle greater than the threshold angle, and is again largely transmitted, as indicated at 62a. Thus essentially all of the described second component eventually escapes from the light pipe and appears in beam 60.

Beam 60 is substantially contained within the cone defined by the rays 62, which were incident upon cell window 12 essentially at grazing incidence. The inner limit of beam 60 is theoretically the surface of light pipe 30, but for practical purposes may be considered as a cone of small angle, as indicated at 64. The beam is thus of generally annular, coaxial form. As shown in FIG. 1, beam 60 is concentrated on the utilization device 50 by the concave mirror 46, which forms an end wall of chamber 41.

FIG. 2 illustrates the use of refractive optics in place of the mirror of FIG. 1. Light pipe 30a is immersed in liquid contained in the chamber 41a, of which one end wall comprises the planoconvex lens 70. Beam 60a is rendered substantially parallel by leans 70, and is then focused on the utilization device 50a by the second lens 72. Incident radiation for energizing cell 10 is supplied to light pipe 30a from source 20 via the lens 24 and the reflector 76, which may comprise a right-angle prism or may be integrated with the light pipe. Incident radiation is then not directly seen by device 50a.

Since a resonance backscatter cell inherently forms an extended source, typically filling the end of the light pipe, the optical aberrations caused by refraction at the light pipe surfaces are of little practical consequence. Whereas such aberrations can be largely corrected by employing one or more nonspherical optical surfaces of suitable form, fully effective handling of beam 60 ordinarily does not require highly corrected optics, whether of reflective or refractive type.

The important function of transforming the diffuse beam of essentially Lambertian distribution from cell 10 or its equivalent into the relatively concentrated beam indicated at 60 is accomplished primarily by refraction as the light is received from cell 10 has an index of approximately unity, the cone angle of the beam within the light pipe will always be appreciably less than 180°, and typically less than 90°. The limiting angle of the beam is further reduced as it passes from the light pipe into the immersing medium 40. However, that chance of angle is relatively slight, and the primary function of the immersing medium can be viewed as enabling the desired radiation to escape from the light pipe while retaining radiation that is directed closer to the axis and is not desired.

The limiting angle of beam 60 decreases with increasing value of the index of refraction of light pipe 30. Increasing the value of that index also reduces the index ratio that is required to contain an incident beam of given solid angle. It is therefore generally advantageous to employ a light pipe having a relatively high index of refraction, such as 1.6 to 1.8, for example, and to employ an immersing medium having an index only slightly less than that of the light pipe, the difference being ordinarily less than 0.05, and in some instance only 0.01 or even smaller. The rays shown somewhat schematically in FIG. 1 are based upon indices of refraction of 1.6 for light pipe 30 and 1.55 for immersing medium 40, those values being selected largely for clarity of illustration. Selection of actual values for any particular system will ordinarily take account of the special requirement and parameters of the system especially the limiting angle of incident beam 25.

The operation and effectiveness of the invention may be clarified by reference to FIG. 3, showing three schematic polar plots of radiation flux at arbitrary scale. Curve A represents a normal Lambertian distribution, in which the flux per unit solid angle is proportional to the cosine of the angle $\theta$ from the axis. Curve B represents the corresponding dependence of total flux upon angle $\theta$, obtained by integrating curve A with respect to azimuth angle. That total flux is proportional to $\sin 2\theta$, and extends from 0° to 90° with maximum at 45°. Curves A and B represent typical distribution of backscatter radiation from cell 10 with respect to the axis 22. The angle indicated as $\theta_o$ represents a typical limiting angle of the incident radiation beam, shown illustratively as corresponding to a lens operating at $f/2$. The collection system must ordinarily reject all radiation within that cutoff angle in order to exclude unprocessed incident radiation that has been specularly reflected and the like. In air, the optics needed for efficient collection of the wanted radiation of curve B would have to cover all angles from $\theta_o$ to nearly 90°.

Curve C shows the remarkable concentration produced in the radiation pattern B upon entering light pipe 10, even for the relatively mild index value of 1.6. The entire response function shrinks toward the axis, shifting the extreme rays from 90° to 39°, and moving the peak intensity from 45° to 26°. The radiation nearer the axis is also shifted, but through progressively smaller angles. Moreover, cutoff angle $\theta_o$ is effectively shifted along with the rest of the pattern, so that, assuming appropriate selection of the index of refraction of the immersing medium, there is no increase in the fraction of the wanted radiation that must be discarded to avoid contamination by incident radiation.

I claim:

1. In combination with a radiation source emitting along an axis a relatively concentrated radiation component and a relatively diffuse radiation component, optical means for collecting radiation of the diffuse component while rejecting radiation of the concentrated component, comprising an optical light pipe mounted on the axis and having an end face directed toward the source for receiving radiation of both said components, an optical medium surrounding the light pipe sidewalls in optical contact therewith, and having an index of refraction greater than unity and less than the index of refraction of the light pipe, said indices of refraction being so selected that essentially all radiation of the concentrated component entering the light pipe is totally reflected at the light pipe sidewalls and that a major portion of the radiation of the diffuse component entering the light pipe is transmitted through the light pipe sidewalls into the medium as a generally coaxial annular radiation beam, and optical condensing means for collecting said annular radiation beam.

2. Optical means as defined in claim 1, and in which the index of refraction of said medium is at least about 0.95 times the index of refraction of the light pipe.

3. Optical means as defined in claim 1, and in which said medium comprises a transparent liquid contacting the sidewalls of the light pipe and enclosed within a generally coaxial chamber, said optical condensing means including an optical element forming an end wall of the chamber.

4. Optical means as defined in claim 1, and in which said radiation source comprises fluorescent material having a plane front surface perpendicular to said axis and capable of being energized by relatively concentrated radiation directed along the axis toward said surface, said relatively concentrated emitted radiation component comprising energizing radiation specularly reflected at said surface and said relatively diffuse emitted component comprising fluorescent emission from said material, said combination including means for directing radiation in a relatively concentrated beam toward the other end of said light pipe for transmission along the pipe by total reflection at its sidewalls to energize the radiation source.

5. In combination,
a device for translating a relatively concentrated beam of incident radiation into a relatively diffuse beam of processed radiation, said device including an aperture for receiving incident radiation and for delivering processed radiation,
an optical light pipe having one end face optically directed toward the aperture for radiation interchange with the device,
means for directing into the other end of the light pipe incident radiation in a concentrated beam,
structure immersing the light pipe sidewalls in an optical medium having an index of refraction greater than unity and less than the index of refraction of the light pipe,
said indices of refraction being such that substantially all incident radiation is retained within the light pipe by total reflection at the sidewalls for delivery to the device, and such that a major portion of the diffuse processed radiation delivered through said one end wall to the light pipe from the device is transmitted through the light pipe sidewalls into the medium as a generally coaxial annular radiation beam, and
optical condensing means for collecting said annular radiation beam.

6. The combination defined in claim 5, and in which said radiation-translating device comprises a resonance backscatter cell having a window at said aperture.

7. The combination defined in claim 6, and in which said window is of such form that substantially all incident radiation that is specularly reflected by the window back into the light pipe is retained therein by total reflection at the sidewalls.

8. The combination defined in claim 5, and in which the index of refraction of said medium is at least about 0.95 times the index of refraction of the light pipe.

* * * * *